United States Patent Office 3,146,245
Patented Aug. 25, 1964

3,146,245
PREPARATION OF 5α-BROMO-6β-HYDROXY STEROIDS
Johannes Andreas Hanegraaf, Oss, Netherlands, assignor to Organon Inc., West Orange, N.J., a corporation of New Jersey
No Drawing. Filed Sept. 3, 1963, Ser. No. 306,328
Claims priority, application Netherlands Sept. 25, 1962
2 Claims. (Cl. 260—397.4)

The invention relates to a process for the preparation of 5α-bromo-6β-hydroxy-steroids by reaction of a $\Delta^5$-steroid with hypobromous acid or a hypobromous acid providing agent in the presence of an organic solvent.

It is known that unsaturated steroids can be converted into the corresponding bromohydrine compounds with hypobromous acid, thus starting from a $\Delta^{9(11)}$-steroid a 9α-bromo-11β-hydroxy compound is obtained and starting from a $\Delta^5$-steroid the corresponding 5α-bromo-6β-hydroxy compound.

Especially the last few years last-mentioned group of bromohydrine compounds has become most important in connection with the development of a new method for the preparation of 19-nor-steroids. For until recently 19-nor-steroids were prepared by dehydrogenation of $\Delta^4$-3-keto-steroids in 1,2-position, aromatization of the resulting $\Delta^{1,4}$-3-keto-steroids, followed by conversion of the resulting $\Delta^{1,3,5(10)}$-3-hydroxy-steroids into $\Delta^4$-3-keto-19-nor-steroids, such as 19-nor-testosterone, the 17-alkyl derivatives thereof, 19-nor-progesterone and the like, by reduction after etherification in 3-position.

A better method for the preparation of 19-nor-steroids consists in that 6β-hydroxy-10-methyl-steroids are converted into 6,19-oxide-steroids by oxidation with a metal acylate, whereupon the 6,19-oxido ring is opened by reduction to obtain 19-hydroxy-steroids, which after a possibly preceding oxidation of the 19-hydroxyl group are converted into 19-nor-steroids by treatment with a strong base.

The 6β-hydroxy-steroids to be applied as starting products in this process can now be prepared in an efficient manner from $\Delta^5$-steroids by conversion of the latter into the corresponding 5α-bromo-6β-hydroxy compounds by means of hypobromous acid by any method known per se. The fact that these starting products have a bromine atom in 5-position is in most cases a great asset, because most of the biologically active 19-nor-steroids have a double bond between the carbon atoms 4 and 5, or 5 and 6, and such a bond can be very easily introduced by dehydrobromination of the 5α-bromo-steroid.

According to the methods described in the literature 5α-bromo-6β-hydroxy-steroids are prepared by reacting $\Delta^5$-steroids with hypobromous acid or hypobromous acid providing agents, the reaction being preferably performed in the presence of a strong acid, such as perchloride acid.

These known conversions are performed in the presence of dioxane as solvent. Experimental investigations have shown that performed in this manner the present reaction yields at best 70 to 75% by weight only. On application of other solvents, such as alcohols, especially tertiary alcohols, even lower yields were obtained, while others, such as ketones or ethyl acetate gave at best a slight improvement in the yield as compared with dioxane (75 to 80%).

Surprisingly it has been found now that when the present reaction is performed in an aliphatic ether as solvent a considerable improvement is obtained in the yield. Generally yields of bromohydrine compounds vary now from 95 to 100 percent by weight, which means an increase of about 20% or more relating to the common solvents.

Generally ethers can be applied indicated by the general formula:

$$R_1—O—R_2$$

in which $R_1$ and $R_2$ represent an aliphatic hydrocarbon chain with 1–6 carbon atoms.

As examples of ethers to be applied are mentioned: dimethyl ether, diethyl ether, methylethyl ether, di-isopropyl ether, di-isobutyl ether, butylmethyl ether, etc. Usually diethyl ether is used as solvent.

The addition of hypobromous acid to $\Delta^5$-steroids can be performed by dissolving the relative steroid in an aliphatic ether, adding hypobromous acid or a hypobromous acid providing agent to it in the presence of water.

As hypobromous acid providing agents are mentioned: N-bromo-derivatives of lower aliphatic carboxylic acid amides or imides, such as N-bromoacetamide and N-bromosuccinimide or other compounds, such as dibromodimethyl hydantoin. For preference N-bromoacetamide is applied. The reaction is usually performed in the presence of a strong acid, such as perchloric acid or sulphuric acid. The former is preferred.

The reaction period and reaction temperature are not tied to strict limits, but the reaction is usually performed in 10 to 60 minutes at a temperature varying between 0° and boiling point of the solvent.

The concentration of the steroid solution, too, is not very important either. Favourable results were obtained with 5 to 100 ml. of ether per 1 gm. of steroid.

The invention is illustrated further by the following examples:

Example I

To a suspension of 10 gm. of $\Delta^5$-3β,17-dihydroxy-androstene-3-acetate-17benzoate in 150 ml. of diethyl ether are added 3.5 gm. of N-bromoacetamide and a mixture of 4 ml. of perchloric acid and 10 ml. of water, after which the reaction mixture is stirred for 20 minutes at 20° C. The reaction is decomposed by the addition of a solution of sodium sulfite, after which the ether layer is separated, washed with a solution of 5% sodium sulfite, water, a solution of 5% sodium bicarbonate and next with water until neutral. Next the solution of ether is dried on sodium sulfate and then evaporated to dryness in vacuo. The residue is recrystallized from a mixture of acetone and hexane to obtain the 3β,6β,17β-trihydroxy-5α-bromo-androstane-3-acetate-17-benzoate in a yield of 100% by weight. Melting point=153–156° C. (under decomposition).

The conversion described before was also performed in some so far conventional solvents.
The results of these comparative tests were as follows:
(a) Solvent: dioxane. Yield: 71% by weight.
(b) Solvent: t-butanol. Yield: 62% by weight.
(c) Solvent: ethylacetate. Yield: 72% by weight.

Example II

One hundred grams of $\Delta^5$-3β,17β-diacetoxy-androstene are suspended in 1500 ml. of methylethylether and cooled to 17° C. Next 35 gm. of N-bromoacetamide are added to this mixture and then a mixture of 40 ml. of perchloric acid and 100 ml. of water.

The mixture is stirred for 15 minutes at 20° C., whereupon the reaction is decomposed by the addition of sodium sulfite.

After working up and crystallisation as described in Example I, the 3β,6β,17β-trihydroxy-5α-bromo-androstane-3,17-diacetate is obtained in a yield of 97.5% by weight. The same result was obtained using N-bromosuccinimide.

In the same manner the $\Delta^5$-3β-acetoxy-17β-benzoxy-androstene is converted into the corresponding 5α-bromo- 6β-hydroxy compound in a yield of 94.5% by weight by application of di-isopropyl ether.

*Example III*

To a suspension of 100 gm. of Δ⁵-3β-acetoxy-17-keto-androstene in 1250 ml. of dimethyl ether are added at 15° C. 35 gm. of N-bromoacetamide, 20 ml. of perchloric acid and 50 ml. of water, after which the reaction mixture is stirred for 20 minutes at 18° C. Next the mixture is treated further by the process described in Example I to obtain the 3β,6β-dihydroxy-5α-bromo-17-keto-androstane-3-acetate in a yield of 96% by weight.

*Example IV*

A mixture of 12 gm. of Δ⁵-3β-acetoxy-20-keto-pregnene, 240 ml. of diethyl ether, 4.2 gm. of N-bromoacetamide, 5 ml. of perchloric acid and 12 ml. of water are stirred for 35 minutes at room temperature, after which the mixture is worked up by the process described in Example I to obtain the 3β-6β-dihydroxy-5α-bromo-20-keto-pregnane-3-acetate in a yield of 93.5% by weight.

I claim:

1. In the process for the preparation of 5α-bromo-6β-hydroxy steroids by the reaction of a Δ⁵-steroid with a compound selected from the group consisting of hypobromous acid and a hypobromous acid providing agent in the presence of an organic solvent, the improvement which comprises performing said reaction in a saturated aliphatic ether of the formula:

$$R_1-O-R_2$$

in which $R_1$ and $R_2$ represent aliphatic hydrocarbon radicals containing from 1 to 6 carbon atoms.

2. The process of claim 1 in which the aliphatic ether is diethyl ether.

No references cited.